M. IRION & A. E. MUELLER.
REGISTERING MECHANISM.
APPLICATION FILED JULY 2, 1914.
1,148,516.
Patented Aug. 3, 1915.
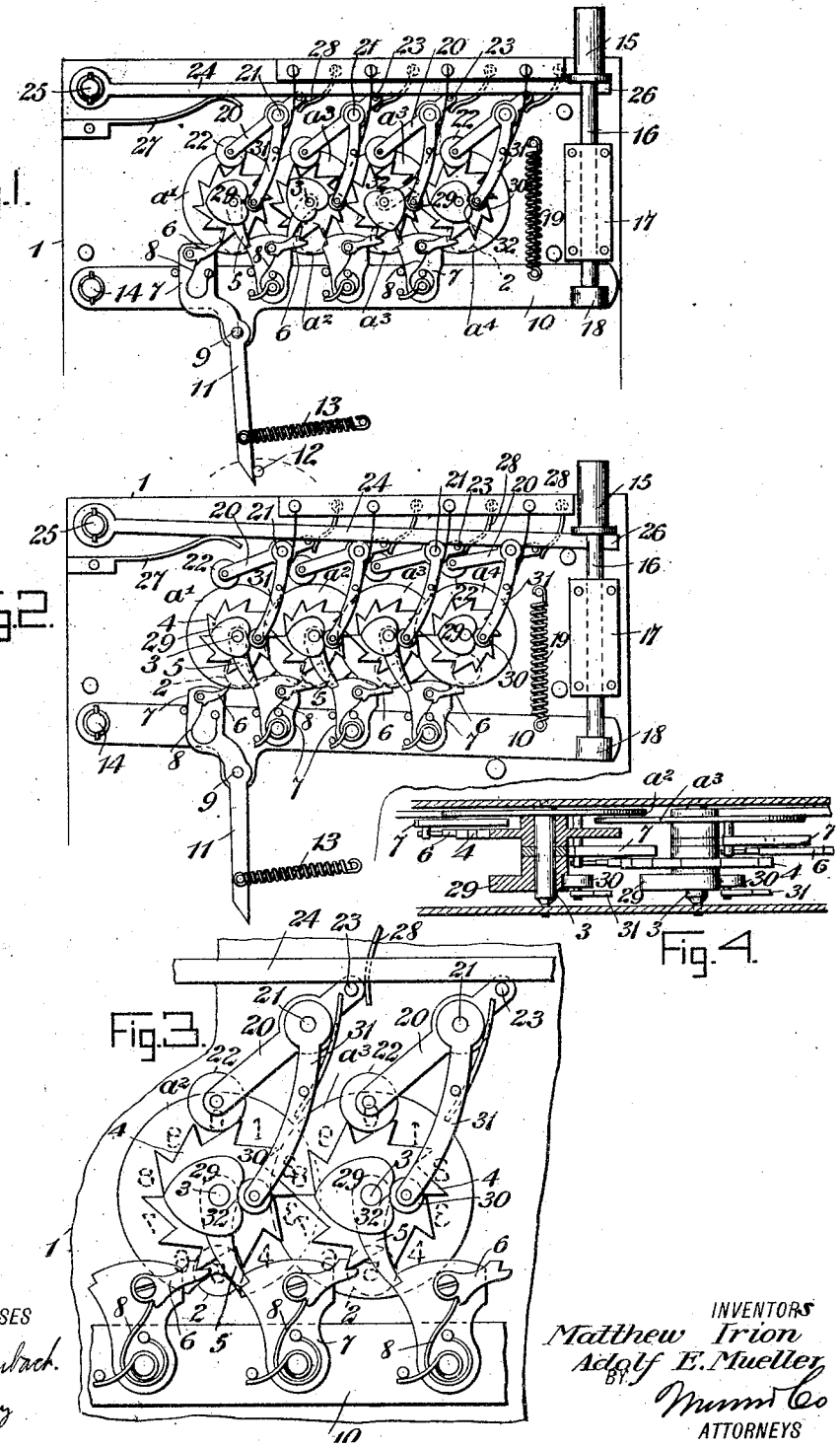
WITNESSES
C. K. Reichenbach.
C. Bradway
INVENTORS
Matthew Irion
Adolf E. Mueller
BY
Munn & Co
ATTORNEYS

UNITED STATES PATENT OFFICE.

MATTHEW IRION AND ADOLF EDUARD MUELLER, OF LOUISVILLE, KENTUCKY.

REGISTERING MECHANISM.

1,148,516. Specification of Letters Patent. Patented Aug. 3, 1915.

Original application filed April 11, 1914, Serial No. 831,237. Divided and this application filed July 2, 1914.
Serial No. 848,601.

*To all whom it may concern:*

Be it known that we, MATTHEW IRION and ADOLF E. MUELLER, citizens of the United States, and residents of Louisville, in the county of Jefferson and State of Kentucky, have invented a new and Improved Registering Mechanism, of which the following is a full, clear, and exact description.

This invention relates to the registering mechanism especially adapted for speedometers or other instruments wherein it is desirable to reset the number wheels or indicating elements back to zero or initial position.

The general object of the present invention is to provide a simple, effective and novel measuring mechanism which is reliable and accurate in use and so designed that the number wheels or indicating elements will be reset instantly to zero position, merely by the pressing of a push button or an equally simple operation.

Another object of the invention is the provision, in connection with each number wheel, of means for moving the wheel step by step, in combination with a device tending constantly to restore the wheel to initial position, but which device is operative only when the first-mentioned means is released, whereupon the number wheel is automatically returned to zero position.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention, and wherein similar characters of reference indicate corresponding parts in all the views. Figure 1 is a rear view of a registering mechanism with the parts in position for operation; Fig. 2 is a similar view showing the resetting means as just having finished resetting the number wheels for returning them to zero position; Fig. 3 is an enlarged view of two of the number wheels and associated operating means; and Fig. 4 is a plan view of a portion of the registering mechanism with the operating means of one of the wheels in section.

It will be understood that the registering mechanism can be used with various kinds of instruments in which time, distance or any other quantity is to be measured.

In the present instance 1 designates a plate which has suitably arranged openings 2 for exposing the number-carrying wheels or other elements. Behind the openings 2 are the wheels $a'$, $a^2$, $a^3$, $a^4$, so that the number of each wheel will be exposed, the numbers of the respective wheels representing units, tens, hundreds, thousands, etc. On the spindle 3 of each number dial is a ratchet wheel 4 and also a fixed pawl or finger 5. Coöperating with the toothed wheels 4 are pawls 6 that are pivoted on swinging carriers 7, and on each carrier is a spring 8 which has its free end engaging the pawl 6 thereon to maintain such pawl in operative relation with its associated toothed wheel 4. The carrier 7 for the first number dial $a'$ is fulcrumed at 9 on a lever 10 and has a depending arm 11 so arranged that its lower extremity lies in the circular path of travel of a pin 12, or equivalent actuator, so that, as the latter moves, it will engage the depending arm 11 and cause the latter to move to the left, Fig. 1, against the tension of the spring 13, and finally the pin 12 will pass under the arm 11, so that the spring 13 will restore the latter to normal position. In this manner the upper pawl-carrying extremity of the carrier 7 is oscillated through an arc sufficient to cause the pawl 6 to turn the wheel 4 of the first number dial $a'$ one step. After the number wheel or dial $a'$ makes one revolution, the finger 5 thereof engages the second carrier 7 and rocks the same to the right, Fig. 2, and causes its pawl 6 to move the number wheel $a^2$ one step, and this number wheel when completing one revolution will in turn move the third number wheel $c^3$ one step. As all the pawl carriers 7 are mounted on the lever 10, which latter is fulcrumed at 14 in the casing of the machine, it is merely necessary to move the lever downwardly to disengage the pawls of the carriers from the toothed wheels 4 in order to enable the registering mechanism to be reset to zero position. This movement of the lever 10 is performed by a push button 15 having a stem 16 slidable in a guide 17, with the lower end of the stem engaging a shoulder 18 on the free end of the lever. A spring 19 is connected with the lever and serves to return the latter to initial position when pressure on the push button 15 is released, and the spring also maintains the lever normally raised, where the pawls will be operatively related to the toothed wheel 4. To prevent over-travel of the toothed wheel 4, each wheel has associated therewith a hold-back pawl 20, pivoted at 21 and having on its free end a roller 22 which enables the toothed wheel to readily turn when it is actuated, but which is adapted to engage between two adjacent teeth and hold the same against rotation as the actuating pawl 6 is retracting after it has moved the toothed wheel one step. These stop pawls 20 are adapted to be released from the toothed wheels at the same time the pawls 6 are released for enabling the number wheels of the registering mechanism to be reset, and for this purpose the upper ends of the pawls 20 have projections 23 which lie under a common depressing lever 24, which lever is fulcrumed at 25 on the frame of the device and has a free end 26 which is disposed in engagement with the push button 15, so that as the latter is pressed downwardly, the lever 24 will move in the same direction in opposition to its retracting spring 27, whereby the said lever 24 will tilt the pawls 20 against the tension of their respective springs 28, so that the rollers 22 of the pawls will be raised out of engagement with the toothed wheels 4. The re-setting of the number wheels is effected by each shaft 3 thereof having a heart-shaped cam 29 with which engages a roller 30 on a spring-pressed arm 31. The pressure of this arm acts on its adjacent heart-cam in such a manner that the cam will be turned in one direction or the other until the roller 30 engages the portion of smallest radii, which is of course the indentation 32 of the heart cam, as clearly shown in Fig. 3. When the rollers 30 are engaged with the recesses of their respective heart cams, as shown in Fig. 3, the number wheels or dials $a'$, $a^2$, $a^3$, $a^4$ will be so disposed that their zero numbers will be exposed through the apertures 2 of the face of the speedometer.

From the foregoing description taken in connection with the accompanying drawings, the advantages of the construction and method of operation will be readily understood by those skilled in the art to which the invention appertains, and while we have described the apparatus which we now consider to be the best embodiment thereof, we desire to have it understood that the apparatus shown is merely illustrative, and that such changes may be made when desired as are within the scope of the appended claims.

This application is a division of application Serial Number 831,237, and is made in accordance with the requirements of the Patent Office.

Having thus described our invention, we claim as new and desire to secure by Letters Patent:

1. A registering mechanism including a plurality of number-bearing elements mounted on separate parallel axes, a ratchet wheel connected with each element, a movable carrier associated with each ratchet wheel, a pawl on the carrier engaging the associated ratchet wheel, a spring operating on the carrier to maintain the pawl thereof in engagement with its ratchet wheel, means connected with each number-bearing element to actuate once in a revolution the pawl carrier of the next wheel, a movable support for all the carriers, and means for moving the support to disengage the pawls from the ratchet wheels.

2. A registering mechanism comprising a plurality of number-bearing elements having their axes spaced apart and the elements being in parallel planes, a ratchet wheel connected with each element, a pivoted carrier associated with each ratchet wheel, a pawl on each carrier engaging its associated ratchet wheel, means connected with each of the ratchet wheels to actuate once in a revolution the carrier associated with the next ratchet wheel, a lever on which the carriers are pivotally mounted, means acting on the lever to hold the pawls normally in engagement with the ratchet wheels, and means for moving the lever to disengage the pawls from their ratchet wheels.

3. A registering mechanism comprising a plurality of number-bearing elements, means for moving one element by the next step by step, a spring-pressed pivoted retarding means for each element, a cam connected with each element, a member constantly pressing on each cam, said members having their pivots coincident with the pivots on the retarding means, and a device for simultaneously releasing the retarding means for the number-bearing elements to permit the said members and cams to reset the number-bearing elements to zero position.

4. A registering mechanism comprising a plurality of number-bearing elements mounted on separate axes and disposed parallel, a ratchet wheel connected with each number-bearing element, a pawl associated with each ratchet wheel to move the same step by step, a movable support on which the pawls are mounted, means moving with a number-bearing element and operating on the pawl of the next element, whereby the rotation of one element will move the next element one step, a set of stop pawls separately pivotally mounted to engage the ratchet wheels and located at the side of the latter opposite from the first-mentioned pawls, a movable member for simultaneously releasing the stop pawls, and a common actuator for the said support and movable member to move all the pawls out of engagement with the ratchet wheel.

5. A registering mechanism comprising a plurality of separately mounted number-bearing elements, a ratchet wheel connected with each element, operating pawls engaging the respective ratchet wheels, stop pawls engaging the ratchet wheels at points opposite from the operating pawls, means whereby one number-bearing element moves the operating pawl for the next number-bearing element, and means movable in one direction to simultaneously move the operating and stop pawls in opposite directions to disengage the pawls from the ratchet wheels and movable in the other direction to engage the pawls of the ratchet wheels.

6. In a registering mechanism, the combination of a plurality of indicating elements, each rotatable in one direction for counting and in the other direction when resetting, a ratchet wheel connected with each element, a pawl associated with each ratchet wheel to turn the same step by step, an independently movable carrier for each pawl, means for operating the carrier of the first element to turn the latter a step, means movable with each element to actuate the carrier associated with a succeeding element, a common movable support for the carriers, an actuator for moving the support to position where the pawls will be simultaneously disengaged from their associated ratchet wheels, and means for returning the indicating elements to initial position when said pawls are disengaged.

7. In a registering mechanism, the combination of a plurality of indicating elements, each rotatable in one direction for counting and in the other direction when resetting, a ratchet wheel connected with each element, a pawl associated with each ratchet wheel to turn the same step by step, an independently movable carrier for each pawl, means for operating the carrier of the first element to turn the latter a step, means movable with each element to actuate the carrier associated with a succeeding element, a common movable support for the carriers, an actuator for moving the support to position where the pawls will be simultaneously disengaged from their associated ratchet wheels, pawls associated with the ratchet wheels to prevent back travel thereof, a member simultaneously acting on the last-mentioned pawls to release the same from the ratchet wheels, and said member being operatively related with the actuator to be moved thereby, and means for restoring the indicating elements to initial position when the pawls are released from the ratchet wheels.

In testimony whereof we have signed our names to this specification in the presence of two subscribing witnesses.

MATTHEW IRION.
ADOLF EDUARD MUELLER.

Witnesses:
FRED J. RIEBEL,
B. M. HYDE.